US007170519B2

(12) United States Patent
Patel et al.

(10) Patent No.: US 7,170,519 B2
(45) Date of Patent: Jan. 30, 2007

(54) COMPUTER-IMPLEMENTED SYSTEM AND METHOD FOR GENERATING DATA GRAPHICAL DISPLAYS

(75) Inventors: Himesh G. Patel, Apex, NC (US); Frank Lee Wimmer, Raleigh, NC (US); Cleester Daniel Heath, IV, Clayton, NC (US); Paul W. Layne, Cary, NC (US); Kevin Dale Smith, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 86 days.

(21) Appl. No.: 10/122,584

(22) Filed: Apr. 15, 2002

(65) Prior Publication Data

US 2003/0193502 A1 Oct. 16, 2003

Related U.S. Application Data

(60) Provisional application No. 60/368,896, filed on Mar. 29, 2002.

(51) Int. Cl.
*G06T 11/20* (2006.01)

(52) U.S. Cl. .................................... 345/440; 345/440.2

(58) Field of Classification Search ................ 345/440, 345/643, 418, 619, 440.2, 581; 707/102
See application file for complete search history.

(56) References Cited

U.S. PATENT DOCUMENTS

| | | | | |
|---|---|---|---|---|
| 6,301,579 | B1 * | 10/2001 | Becker | 707/102 |
| 6,614,433 | B1 * | 9/2003 | Watts | 345/440 |
| 6,812,926 | B1 * | 11/2004 | Rugge | 345/440 |
| 6,900,807 | B1 * | 5/2005 | Liongosari et al. | 345/440 |
| 2002/0140699 | A1 * | 10/2002 | Miyadai | 345/440 |
| 2002/0149604 | A1 * | 10/2002 | Wilkinson | 345/643 |
| 2003/0030637 | A1 * | 2/2003 | Grinstein et al. | 345/420 |
| 2003/0071814 | A1 * | 4/2003 | Jou et al. | 345/440 |

OTHER PUBLICATIONS

Bissell et al., "Modelling applications of spreadsheets", Jul./Aug. 1989, IEE review, pp. 267-271.

* cited by examiner

*Primary Examiner*—Kee M. Tung
*Assistant Examiner*—Chante Harrison
(74) *Attorney, Agent, or Firm*—Jones Day

(57) ABSTRACT

A computer-implemented system and method for generating data graphical displays. The data is indicative of a plurality of variables. The system and method receive data that is to be displayed in a non-textual format. Graph style data items are retrieved that contain display characteristics for displaying the data in the non-textual format. The data is displayed in accordance with the graph style data items.

59 Claims, 23 Drawing Sheets

```xml
<Report version="1.0" xmlns:style="
http://www.sas.com/reportmodel/styles">
<Data>
    <IQData type="2DEmbedded" name="Data0">
        <EmbeddedData>
            <Variables>
                <Variable name="Year4" varName="Year" label="Year" type="String"/>
                <Variable name="Year31" varName="Year3" label="Year" type="String"/>
                <Variable sasFormat="DOLLAR10.0" encoding="Text" name="Sales9" varName="Sales" label="Sales" type="Numeric"/>
                <Variable encoding="Text" name="__FREQ__14" varName="__FREQ__" label="Frequency" type="Numeric"/>
            </Variables>
            <ValuesList>
                <Values>
                    <Value>1997</Value>
                    <Value>1997</Value>
                    <Value>10000</Value>
                    <Value>1</Value>
                </Values>
                <Values>
                    <Value>1998</Value>
                    <Value>1998</Value>
                    <Value>12000</Value>
                    <Value>1</Value>
                </Values>
                <Values>
                    <Value>1999</Value>
                    <Value>1999</Value>
                    <Value>15000</Value>
                    <Value>1</Value>
                </Values>
                <Values>
                    <Value>2000</Value>
                    <Value>2000</Value>
                    <Value>16000</Value>
                    <Value>1</Value>
                </Values>
```

```
        <Values>
          <Value>2001</Value>
          <Value>2001</Value>
          <Value>19800</Value>
          <Value>1</Value>
        </Values>
112 — </ValuesList>
      </EmbeddedData>
    </IQData>
104 — </Data>
106 — <style:Scheme name="GraphScheme0"> — 130
    <style:Style name="Graph"> — 132
140 —  <style:Style context="GraphDataStyle1" color="#FFA53D" altColor="
#CCCCFF" fillFile="\\dntsrc\sas\m900\ods\misc/Bank64g.gif" fillType
="ImageColorBlend"/>
142 —  <style:Style context="GraphDataStyle2" color="#F7DF54" altColor="
#99FFCC" fillFile="\\dntsrc\sas\m900\ods\misc/Bank64g.gif" fillType
="ImageColorBlend"/>
      <style:Style context="GraphDataStyle3" color="#EF6B48" altColor="
#FFCC99" fillFile="\\dntsrc\sas\m900\ods\misc/Bank64g.gif" fillType
="ImageColorBlend"/>
      <style:Style context="GraphDataStyle4" color="#61A6E7" altColor="
#99CCFF" fillFile="\\dntsrc\sas\m900\ods\misc/Bank64g.gif" fillType
="ImageColorBlend"/>
      <style:Style context="GraphDataStyle5" color="#CB79C8" altColor="
#FFCCFF" fillFile="\\dntsrc\sas\m900\ods\misc/Bank64g.gif" fillType
="ImageColorBlend"/>
      <style:Style context="GraphDataStyle6" color="#85CE79" altColor="
#99CCCC" fillFile="\\dntsrc\sas\m900\ods\misc/Bank64g.gif" fillType
="ImageColorBlend"/>
      <style:Style context="GraphDataStyle7" color="#967CD0" altColor="
#FFFFCC" fillFile="\\dntsrc\sas\m900\ods\misc/Bank64g.gif" fillType
="ImageColorBlend"/>
      <style:Style context="GraphDataStyle8" color="#DD6475" altColor="
#CCFFFF" fillFile="\\dntsrc\sas\m900\ods\misc/Bank64g.gif" fillType
="ImageColorBlend"/>
      <style:Style context="GraphDataStyle9" color="#9DAA2D" altColor="
#FFCCCC" fillFile="\\dntsrc\sas\m900\ods\misc/Bank64g.gif" fillType
="ImageColorBlend"/>
      <style:Style context="GraphDataStyle10" color="#6C69D9" altColor="
#CCFFCC" fillFile="\\dntsrc\sas\m900\ods\misc/Bank64g.gif" fillType
```

```
="ImageColorBlend"/>
     <style:Style context="GraphDataStyle11" color="#2EA64A" altColor="
#CCCCCC" fillFile="\\dntsrc\sas\m900\ods\misc/Bank64g.gif" fillType
="ImageColorBlend"/>
     <style:Style context="GraphDataStyle12" color="#C17D35" altColor="
#CCCC66" fillFile="\\dntsrc\sas\m900\ods\misc/Bank64g.gif" fillType
="ImageColorBlend"/>
     <style:Style context="TwoColorRamp" fillGradientStartColor="
#FFFFFF" fillGradientEndColor="#967CD0"/>
     <style:Style context="TwoColorAltRamp" fillGradientStartColor="
#FFFFFF" fillGradientEndColor="#99CCFF"/>
     <style:Style context="BackFill" fillGradientStartColor="#C4E4B8"
fillGradientEndColor="#FFFFCD" fillGradientType="YAxis" fillType
="Gradient"/>
     <style:Style context="AxisLines" lineColor="#000000" lineThickness
160 ="2px"/>
     <style:Style context="GridLines" lineColor="#000000"/>
     <style:Style context="Outlines" lineColor="#000000"/>
     <style:Style context="BorderLines" lineColor="#000000"
lineThickness="2px"/>
     <style:Style context="LabelText" textColor="#003366" fontSize
162 ="16pt" fontFamily="Times New Roman" fontWeight="bold" fontStyle="normal"/>
     <style:Style context="ValueText" textColor="#000000" fontSize
="12pt" fontFamily="Trebuchet MS" fontWeight="normal" fontStyle="normal"/>
     <style:Style context="WallFill" fillColor="#FFFFCD" fillType
="Pattern"/>
     <style:Style context="FloorFill" fillColor="#FFFFCD" fillType
="Pattern"/>
     <style:Style context="LegendFill" fillColor="#FFFFCD" fillType
="Pattern"/>
     <style:Style context="DropShadow" shadowColor="#142A3E" xOffset
="5%" yOffset="5%"/>
    </style:Style>
106 </style:Scheme>
```

```
108   <View style:scheme="GraphScheme0">
       <Section>
        <Body>
         <Graph name="Graph_1541253545554510" style:height="480px"
      style:width="640px" view2D="true">
170        <ChartDataList>
172         <ChartData name="ChartData0" data="Data0">                    186
180          <Roles>
              <Role variable="Year4" type="Subgroup" sortOrder
      ="Ascending" missingEnabled="true">
              </Role>                                                   182
              <Role variable="Year31" type="Category" sortOrder
      ="Ascending">
              </Role>                                                   184
              <Role variable="Sales9" type="Response" statistic="Sum">
              </Role>
              <Role variable="__FREQ__14" type="Frequency">
              </Role>
             </Roles>
            </ChartData>
170        </ChartDataList>
190        <ChartAreas>
            <ChartArea>
             <Walls>
             </Walls>
             <ChartBorderLine lineVisible="true"/>
192          <Charts>
              <Bar name="Chart0" chartData="ChartData0" styleBy
      ="Subgroup" barShape="Block">
              </Bar>
             </Charts>
200          <Axes>
202           <Axis name="Axis0" role="Category" majorTickCount="5"
      minorTickCount="0">
               <MajorTick lineVisible="false"/>
               <MinorTick lineVisible="false"/>
               <Label textVisible="true"/>
               <AxisValues textVisible="true"/>
202           </Axis>
204           <Axis name="Axis1" role="Response">
               <Label textVisible="true"/>
               <AxisValues textVisible="true"/>
204           </Axis>
```

FIG. 4D

COMPUTER-IMPLEMENTED SYSTEM AND METHOD FOR GENERATING DATA GRAPHICAL DISPLAYS

RELATED APPLICATION

This application claims priority to U.S. provisional application Ser. No. 60/368,896 entitled "COMPUTER-IMPLEMENTED SYSTEM AND METHOD FOR REPORT GENERATION" filed Mar. 29, 2002 (with Express Mail Number EL647389580US, law firm docket number 343355600040, and inventors Shaughnessy et al.). By this reference, the full disclosure of this U.S. provisional application entitled "COMPUTER-IMPLEMENTED SYSTEM AND METHOD FOR REPORT GENERATION" is incorporated herein.

FIELD OF THE INVENTION

The present invention relates generally to computer-implemented display generation and more particularly to generating data graphical displays.

BACKGROUND AND SUMMARY

Graphical depictions of computer-generated data aid users in their analysis and understanding of the data. Many types of software applications can display data graphs, but the styles that define the appearance of graphical displays were traditionally tightly coupled with the software application generating the graphs. Difficulties arose during attempts to use graphical styles defined in one software application in a different software application. Also, the graphical styles defined within a software application usually were limited to fairly small sets of configurable items, such as background colors.

The present invention overcomes the aforementioned difficulties by providing a computer-implemented system and method for generating data graphical displays. The data is indicative of a plurality of variables. The system and method receive data that is to be displayed in a non-textual format. Graph style data items are retrieved that contain display characteristics for displaying the data in the non-textual format. The data is displayed in accordance with the graph style data items.

BRIEF DESCRIPTION OF THE DRAWINGS

FIGS. 4A–4E depict an example of an XML data structure for use in generating graphical output as an example;

DETAILED DESCRIPTION

Figure 1:
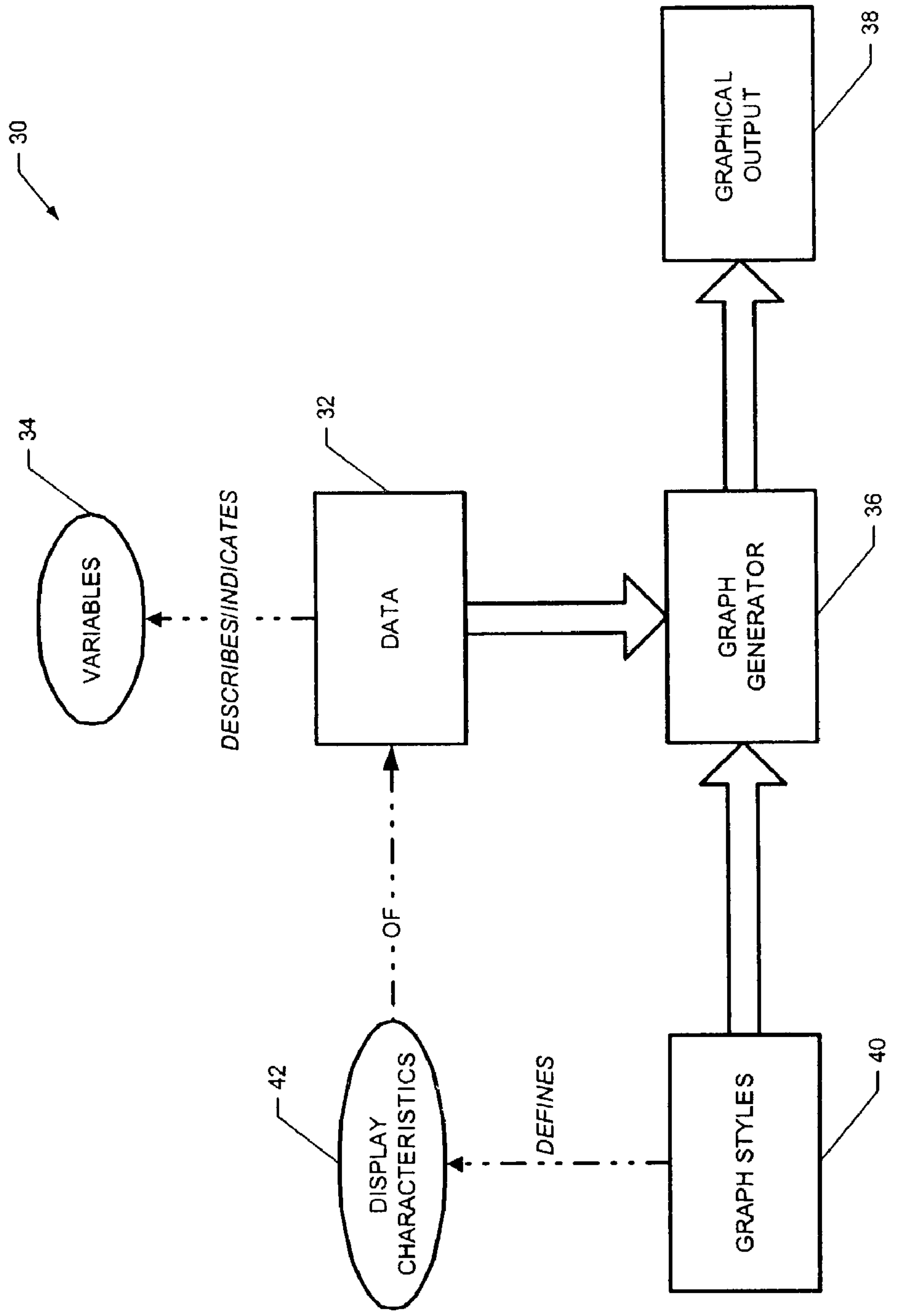
FIG. 1 is a block diagram depicting software and computer components utilized in generating graphical output.

FIG. 1 depicts a computer-implemented system 30 that generates graphical output 38 based upon input data 32. The input data 32 may represent many types of variables 34, such as sales variables, statistical variables, manufacturing output variables, engineering design variables, etc. A graph generator software module 36 processes the input data 32 and generates pie charts, bar charts, maps, scatter plots, or any other type of graphical output 38.

In order to determine how the graphical output 38 should appear, the graph generator 36 accesses graph styles data 40. The graph styles data 40 defines the display characteristics 42 of the data 32. For example, the graph styles data 40 may define the textual label font characteristics or the background display of the graphical output 38. The graph styles data 40 uses predefined style definitions as well as metadata to determine how input data 32 should be visually depicted in the graphical output 38.

Figure 2:
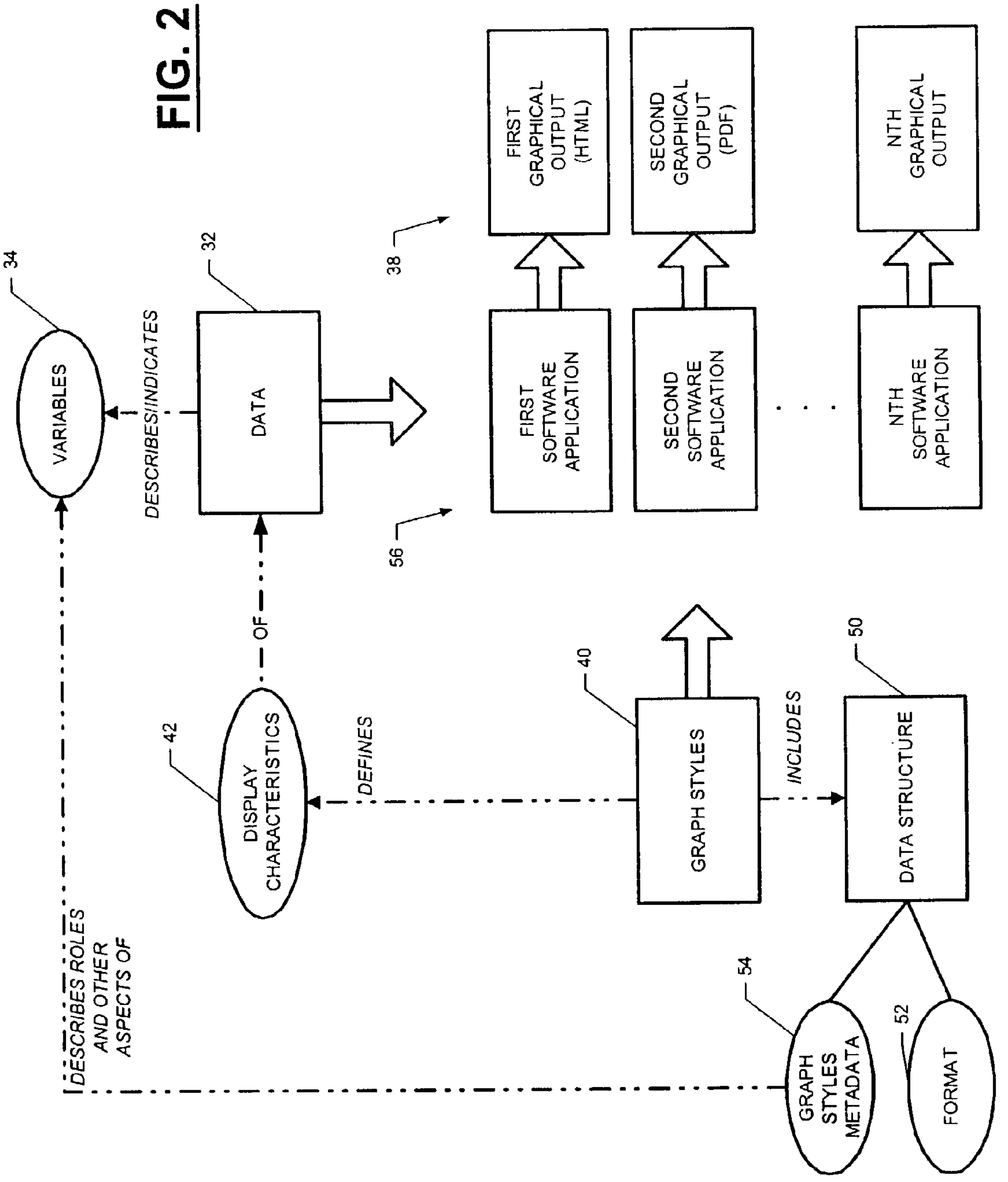
FIG. 2 is a block diagram depicting software and computer components utilizing a graph styles data structure to generate graphical output.

FIG. 2 shows an example where the graph styles data 40 is stored in a data structure 50 that contains graph styles format data 52 and graph styles metadata 54. The graph styles format data 52 may designate the format attributes for one or more regions of the graphical output 38, such as designating that a graph's axis should display major ticks and not display minor ticks. The graph styles metadata 54 may designate format attributes based upon the role(s) that a variable has within the input data.

The graph styles data 40 exists at least substantially independent of the application generating the data or the application generating the graphical output. Thus the same graph styles data 40 may be universally used by multiple software applications 56 to define the applications' respective graphical output appearance as well as the output type (e.g., HTML, PDF, etc.).

Figure 3:
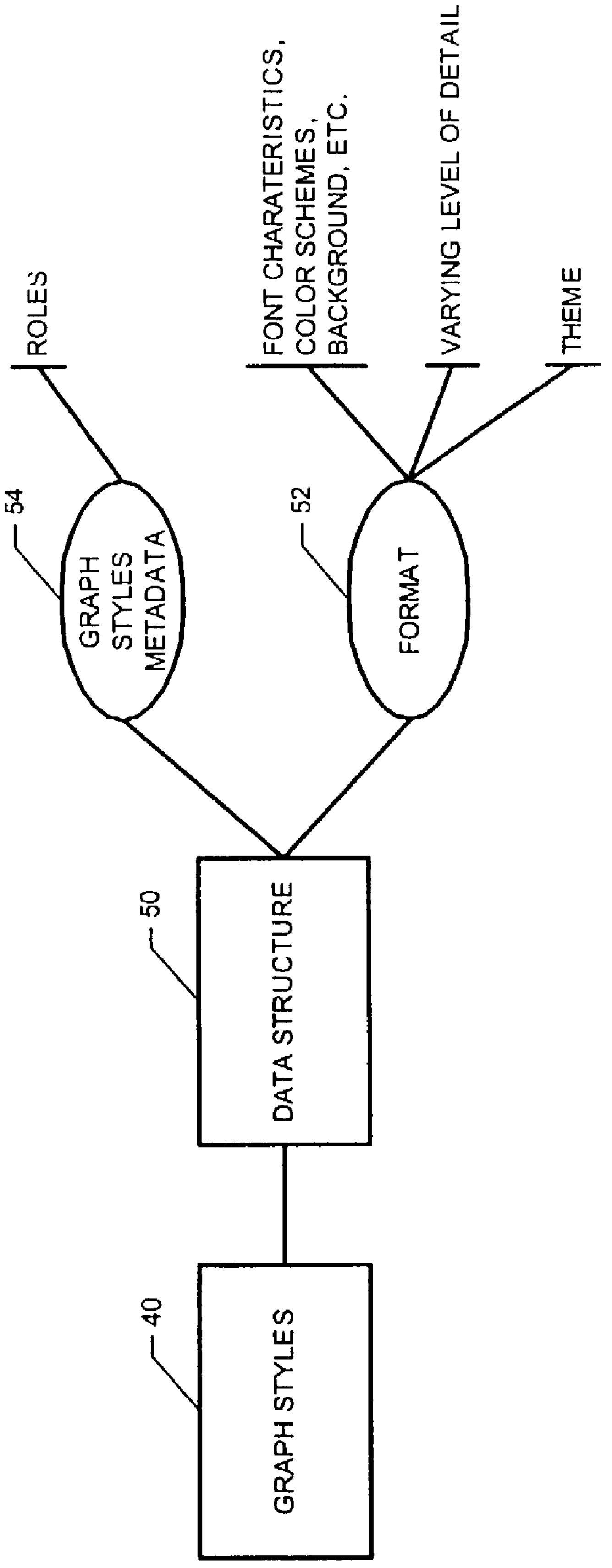
FIG. 3 is a data structure diagram depicting data items used by a graph styles data structure.
Figure 4E:
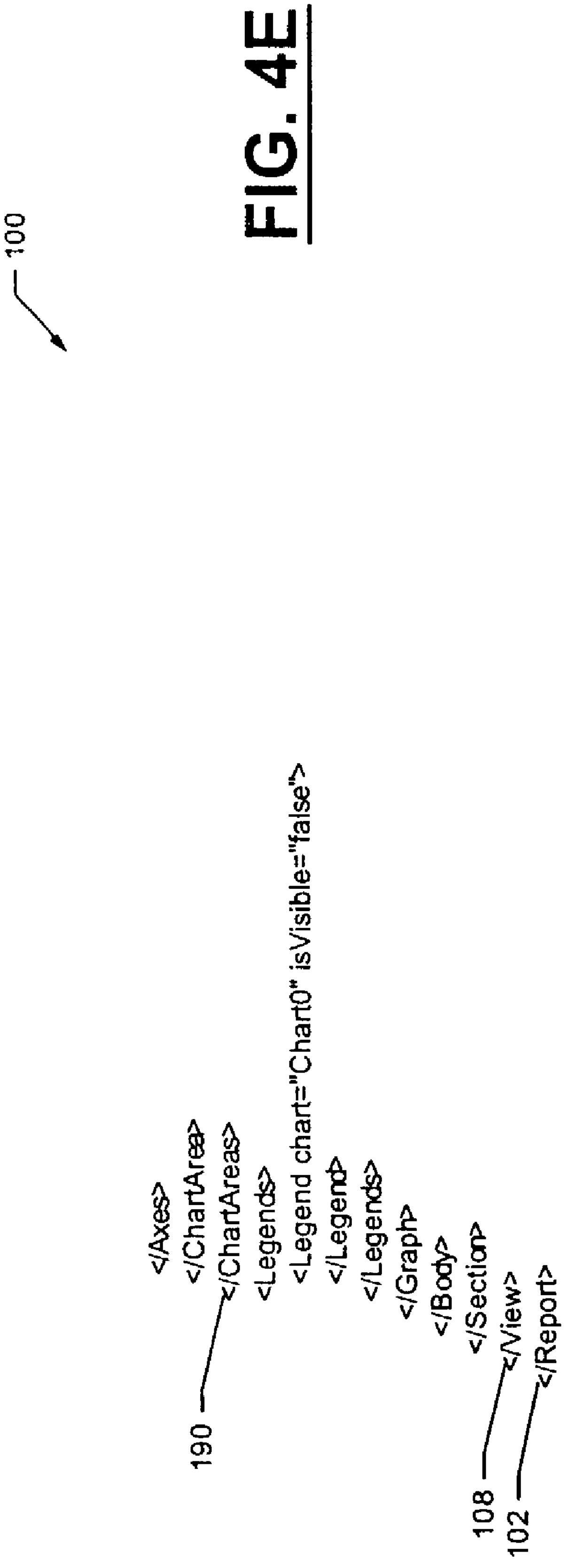

FIG. 3 depicts an example of a graph styles data structure 50. The graph styles data structure 50 contains graph styles format data 52 and graph styles metadata 54. The format data 52 may include graph font characteristics, graph backgrounds, graph color schemes, etc. The format data 52 may be at varying levels of detail. For example, the format data 52 may define styles to be used by all components on a graph, such as all bars in a bar chart. It may also define styles on a per graphical component level, such as the first bar in the bar chart should have one type of style, the second bar should have another type of style, and so on. As another example of the varying level of detail, data that are grouped into sets may have its style defined based upon what set the data is in. In this way, the user may better distinguish between sets of data when viewing the graphical output.

The graph styles data structure 40 also contains metadata 54. The graph styles metadata 54 may designate format attributes based upon the role(s) that a variable has within the input data. For example, a variable may be designated to have as its role in the data set to be the "category" variable.

Different graphical outputs may use this metadata differently. A pie chart will display a category variable differently than a bar chart will. A pie chart will display a category variable as discrete slices of a pie whereas a bar chart will display the category variable along its horizontal axis. As another example, a different variable in the input data may have as its role to be the "response" variable. Once again different graphical outputs may use this metadata differently. The pie chart will determine the size of a pie slice based upon the response variable's data whereas the bar chart will determine the vertical extent of a bar based upon the response variable's data. It should be understood that the same variable may have one or more roles, or even have different roles depending upon the data set it is in.

An aspect of a graph may be formatted based upon a combination of graph styles data associated with a variable and the variable's role. For example, a variable's role may be designated as the dependent variable of a graph. The variable may also be designated to be displayed with a bluish color. The combination of the variable's role along with its graph styles data indicates that the color of the dependent axis be depicted with a bluish color. Also, it should be understood that a variable's role may be directly associated with graph styles data by designating that the graph's independent axis be formatted with a certain style.

The graph styles data structure 50 may also contain format data 52 to indicate a theme for the graphical output. The theme may be based upon data being analyzed in the graphical output. For example, dollar symbols may be used to designate that the data being analyzed relates to money as in a sales analysis graph. The theme may be preselected within the graph styles data structure 50 or it may be a variable that is defined based upon the metadata 54. For example, if a sales variable has as its role to be the response variable, then the a background of dollar signs may be selected to represent the theme of the graphical output. If the number of homes sold is the response variable, then a background showing outlines of homes may be used.

It should be understood that the graph styles data may be structured in many different ways and expressed in many different formats, such as in the structure and format shown in FIGS. 4A–4E.

FIGS. 4A–4E depict an example of a graph styles data structure 100 expressed in an eXtensible Markup Language (XML) format. The XML format permits tags to show how one data item relates to another data item, such as what data item is contained within another data item in the XML hierarchy. The highest level in this example are the report tags 102. The report tags 102 contain the information needed to display graphical output. The report tags 102 enclose subordinate tags to indicate to a graphical generating program the data, styles, and visual representation of the graphical output. The data information is enclosed by data tags 104; the styles information is enclosed by style tags 106; and the visual representation information is enclosed by view tags 108.

The data tags 104 contain variables and values to be used in rendering the graphical output. In this example, the Variables tags 110 contain four variables with the respective names "Year4" (a year-based variable), "Year31" (another year-based variable), "Sales9" (a monetary sales-based variable), and "_FREQ_14" (a frequency variable). In this example, the variables represent yearly sales values (with the frequency variable representing the frequency of data observations contributing to each year).

In this example, the data to be used in rendering the graphical output is embedded within the XML data structure 100. However, it should be understood that there are many ways to provide data to the graphical output generation system such by specifying within the XML data structure one or more external data sources.

The values for each of the four variables are shown within the ValuesList tags 112. For example, the variable Year4 has the value 1997 as shown at 114. The variable Year31 also has the value 1997 as shown at 116. The Sales9 variable has a value of 10000 as shown at 118. The frequency variable has a value of 1 as shown at 120. Additional data (e.g., within Values tags 150) values for the variables are contained in this example within the ValuesList tags 112.

With reference to FIGS. 4B–4C, style tags 106 enclose information to define the appearance of the graphical output. In this example, the style is named GraphScheme0 as shown at 130. Within this style scheme is another style tag 132 to denote that this style scheme is for a graph.

Within these tags 132 are different styles to format different attributes of the graph. For example, style tag 140 for GraphDataStyle1 defines the style to be used for the first set of values to be graphed. The first set of values (as shown by values tags 114, 116, 118 and 120) are to be visually depicted by the GraphDataStyle 1 attributes. For this style, the color, alternate color, fill format, and fill type information are specified within tag 140. The color value #FFA53D denotes that the color for the first set of values is to have a darkish orange color to it. The alternate color attribute value #CCCCFF denotes the color the first set of values should have in the event that the principal color specified has been already taken by another graphic component. The fill attribute designates a file to serve as the interior fill for the first response display (e.g., the first bar in a bar chart). In this example, the Bank64g.gif file contains a graphic image file of interspersed dollar symbols. The fill type attribute indicates how the images and color should be applied to the bar.

Style tag 142 indicates the style to be used for the second set of data values contained within Values tags 150. Styles are provided for additional response variable depictions (up to and including GraphDataStyle12). It should be understood that any number of styles can be used in order to best suit the situation at hand.

Additional style tags are provided to specify the format of other aspects of the graphical output. For example, the format for the graphical output's axis lines are shown at style tag 160. Within the tag 160, the axis line color and its thickness may be specified. As another example, the graph's label text format is designated at style tag 162. Within tag 162, the text color, font size, font family, font weight and font style are provided. It should be understood that any aspect of the graphical output may be placed within a style tag.

The view tags 108 contain data that define what type of graphic representation should be used to display the data defined within the data tags 104. The view tags 108 also contain data that defines the style to format the graphic output's appearance.

The view tags 108 specify that the style scheme "GraphScheme0" should be used in the visual depiction of the data. The view tags 108 specify that a graph is to be generated in the output. The ChartDataList tags 170 specify the data to be used (which in this situation is "Data0" as specified by ChartData tag 172). Also within the ChartDataList tags 170 are Roles tags as shown at 180. The Roles tags 180 specify the role a variable has within the data set. For example, the Year31 variable has as its role within the data set to be the "category" as shown at 182. As another example, the Sales9 variable has as its role within the data set that of a "response" variable as shown at 184. The role tags may specify the sort order for a variable and whether missing values operation should be enabled in order to modify the view of the data without modifying the original data.

The ChartAreas tags 190 contain information about how the different areas within the graphic chart should be displayed and with what data. For example, the Charts tags 192 specify that the chart data for the graphic output is "ChartData0", the bar shape should be a block, and the bar should be styled by the subgroup role variable which in this case is Year4 (as shown by the Role tag 186).

The axes tags 200 contain information about how the graph's axes should be displayed in the chart areas as well as indicating the variables that should be associated with the axes. For example, the axis0 tag 202 (which in this example is the horizontal axis for a bar chart) specifies that the horizontal axis shall have five major ticks and shall be associated with the variable that has the category role in the data set. In this example, the variable Year31 (as shown by Role tag 182) has the category role, and accordingly is associated with the horizontal axis of the bar chart. Other formatting values for this axis may be set such as whether major or minor ticks and label ticks should be visible on the graphical output. For the vertical axis of the bar chart, the variable that has the response role is associated with the vertical axis as specified by the Axis1 tags 204. In this example, the Sales9 variable is identified by Role tag 184 as the response variable.

Figure 5:
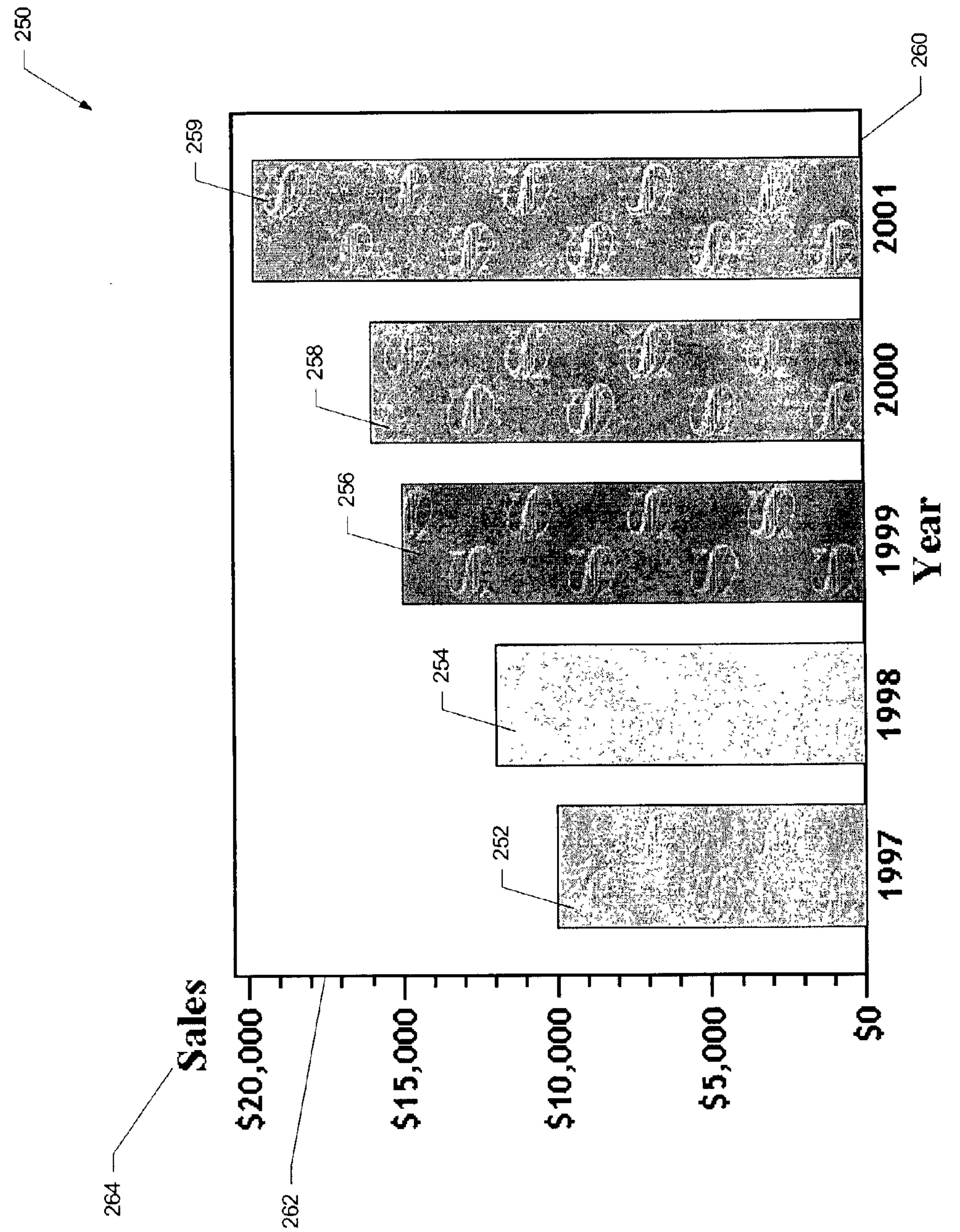
FIGS. 5 and 6 are graphical outputs generated from graph styles data structures.

FIG. 5 shows a bar chart that has been constructed in accordance with the XML data structure 100 of FIGS. 4A–4E. The values contained within the bar chart 250 are in accordance with the data tags 104 contained in the XML data structure 100. For example, on the bar chart 250, the Year 1997 bar 252 has a value of $10,000 as specified in tag 118.

The style of the bar chart 250 is also in accordance with the style tags 106 of the XML data structure 100. Each of the bars (252, 254, 256, 258, 259) is colored in accordance with the style specification. For example, the first bar 252 has the color denoted within the style tag 140 for GraphDataStyle1 (i.e. "#FFA53D"). The first bar 252 contains as its fill interspersed dollar symbols as provided by the graphic image file specified within the GraphDataStyle1 tag 140. Other aspects of the bar chart graphic output 250 are also displayed in accordance with the style specification. For example, the horizontal axis 260 does not show major tick or minor tick lines as specified by the Axis0 tags 202. The horizontal axis 260 also shows the display of the variable whose role is category (i.e., the Year31 variable has as its role the category and thus is displayed as the variable for the horizontal axis 260). Correspondingly, the vertical axis 262 has its format and associated variable shown in accordance with the Axis1 tags 204. Thus, the vertical axis label "sales" 264 is shown in accordance with the Axis1 tags 204. Also, the variable Sales9 is the variable associated with the vertical axis 262 in accordance with the Axis1 tags 204.

Figure 6:
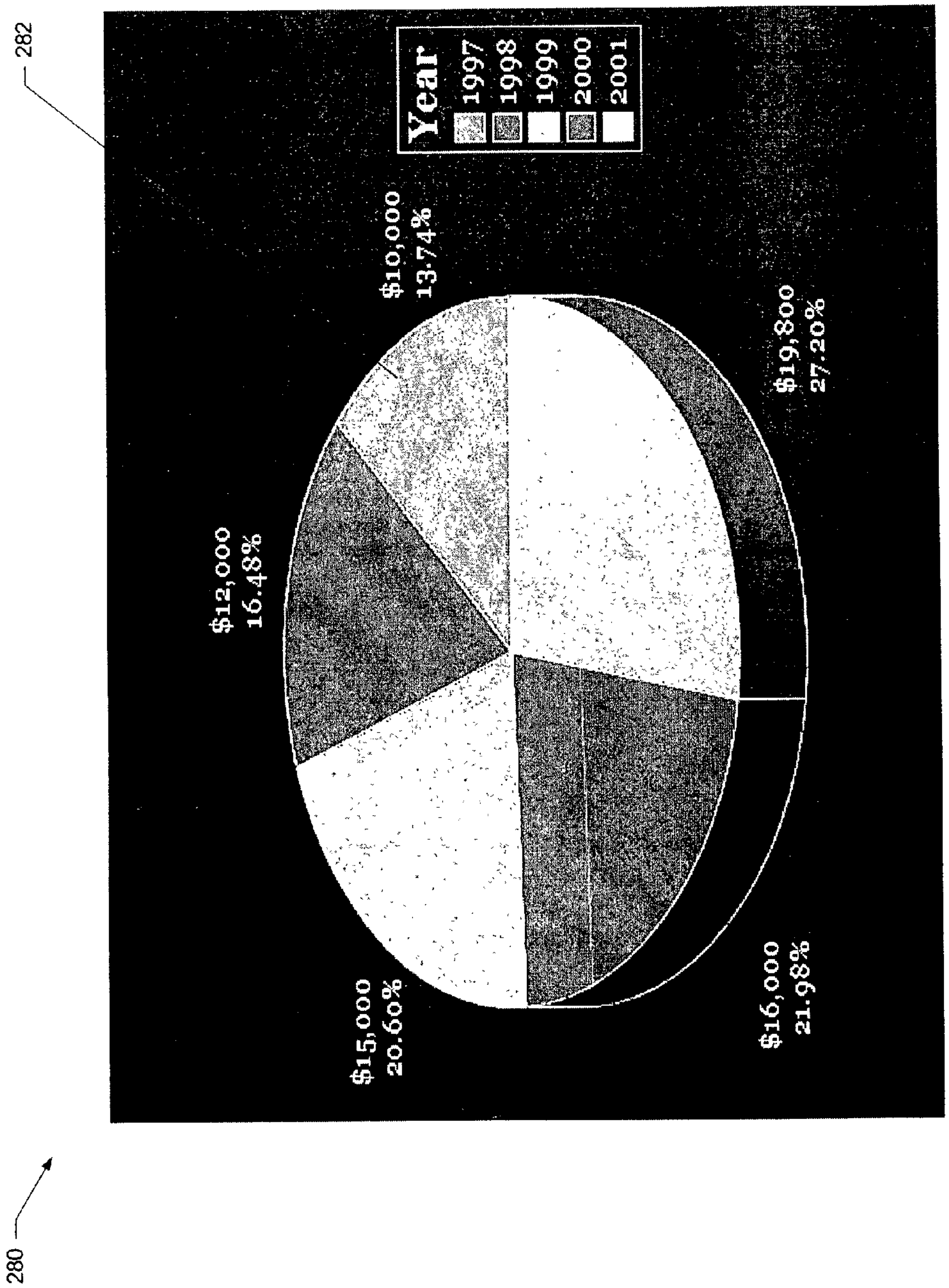

FIG. 6 depicts a pie chart depiction 280 of the data shown within the XML data structure 100 of FIGS. 4A–4E. The pie chart 280 uses the variables in the same roles set forth in the ChartDataList tags 170, but has changed the color values as well as the fill values in displaying the data values. For example, the first graphical component 282 has a bluish color whereas the first component had a dark orange color at 252 on FIG. 5.

It should be understood that the graph styles data structure uses a metadata approach whose abstraction is at a level above the particular type of graphic used to display the data. Thus, metadata (such as what role a variable has within a data set and the format style of a variable based upon its role) is used independent of the graphic type used to depict the data.

Figure 7:
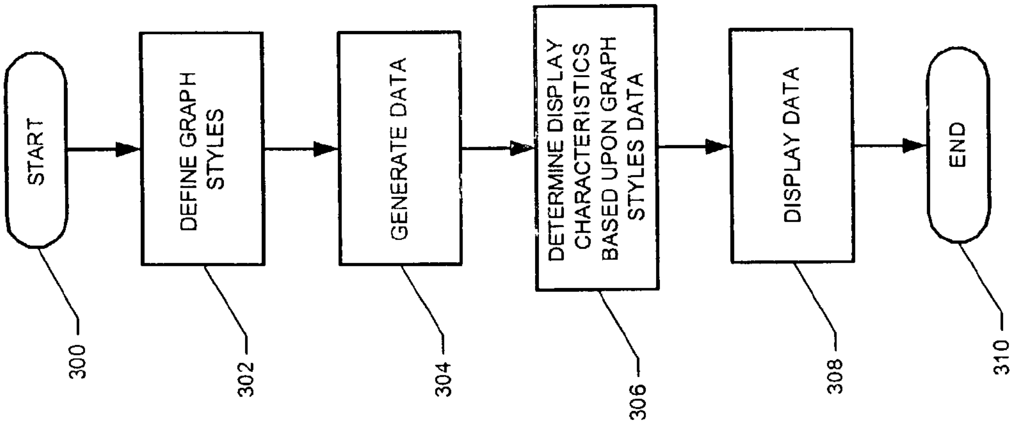
FIG. 7 is a flowchart that depicts an operational scenario for generating graphical output.

The definition and generation of graphic output via the graph styles data may be performed in many different ways. One such method is shown by the flowchart of FIG. 7. With reference to FIG. 7, start block 300 indicates that the method begins at process block 302. At process block 302, the graph styles data (as well as possibly the underlying data to be used) are defined. It should be noted that the generation of the graph styles data does not have to occur at the time that the data source is designated, but instead a large number of graph styles may be predefined so that the user at the time that the data is generated may specify the type of graph styles that should be used to depict the data. For example, such unique graph styles as the following may be predefined: an analysis style (e.g.; showing a magnifying glass in the background); an astronomy style; a banker style; a blockprint style; a convention style; a curve style; an education style; an electronics style; a gears style; a magnify style; a money style; an RSVP style; a science style; a sketch style; a statistical style; a torn style; a watercolor style; and others. These styles may allow the following display characteristics to used with non-textual output: soft shadows around text; transparency of data primitives, legends and graphics area; texture maps on data primitives and graphics area; background images specific to industries; use of specific fonts to highlight labeling and values; color scheme to enhance the overall appearance of the graphs; gradient fills for the graphics area; linestyles to highlight data; and others.

At process block 304, the data to be graphically depicted is generated. The graphic output rendering module determines at process block 306 the display characteristics for the generated data based upon the defined graph styles data. At process block 308, the data is graphically displayed based upon the determined displayed characteristics. Unless the user wishes to perform another action, processing for this operational scenario terminates at end block 310.

Figure 8:
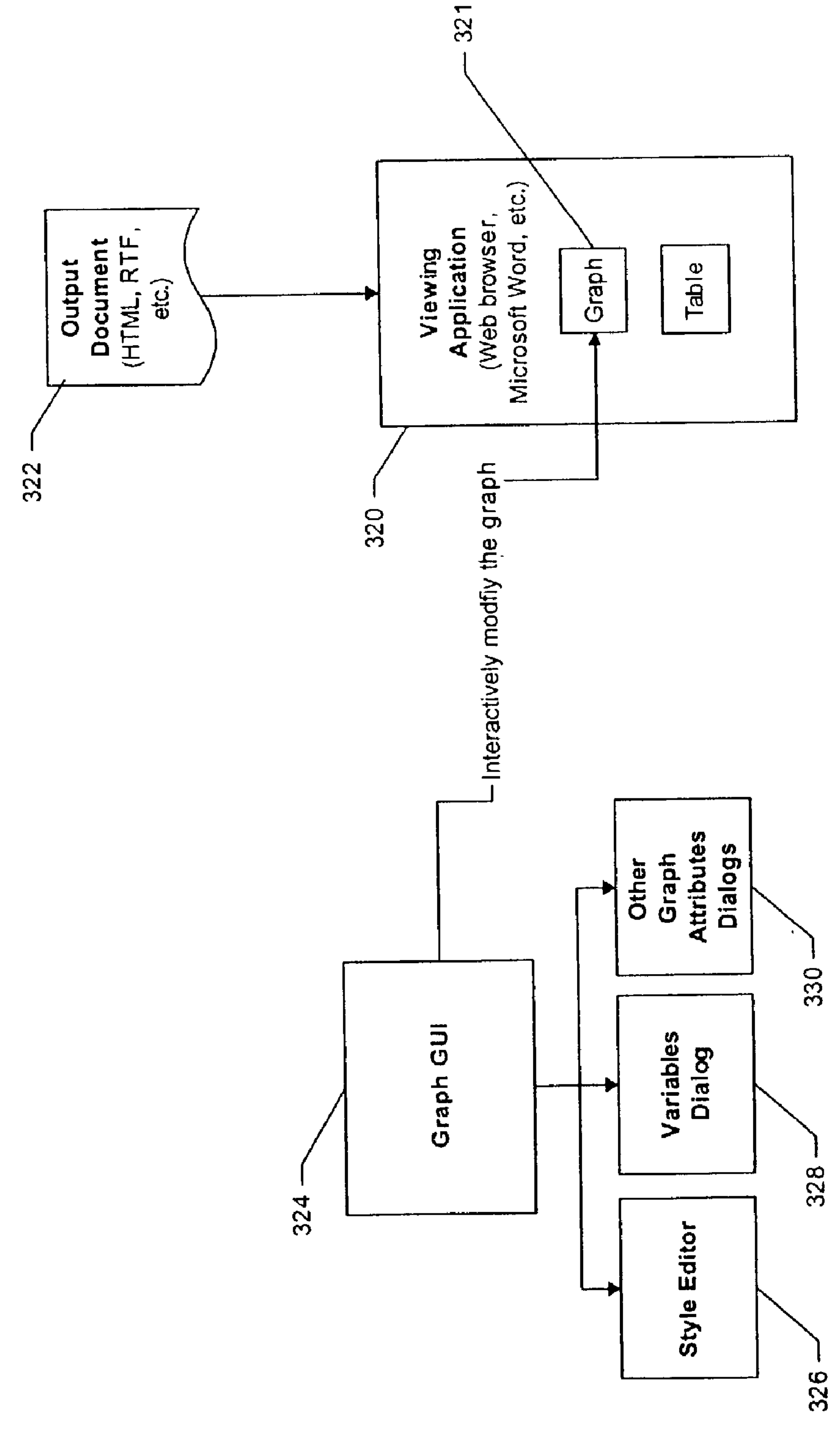
FIG. 8 is a block diagram that depicts a graphical user interface (GUI) for modifying a graph styles data structure.

FIG. 8 shows use of a graphical user interface to interactively modify styles of a graphical output. In this example, a viewing application 320 (such as a web browser, Microsoft Word, etc.) displays a graphical output 321 that has incorporated an output document 322. A user can access a graphical user interface 324 to modify the appearance of the graphical output 321. To accomplish this, the interface 324 may include a style editor 326 so as to modify one or more of the styles associated with the graph 321. The interface 324 may also include a variable dialog interface 328 so that the data shown in the graph 321 may be modified. The interface 324 may also include other graph attribute dialog interfaces in order to modify more specific characteristics of the graph's appearance.

Figure 9:
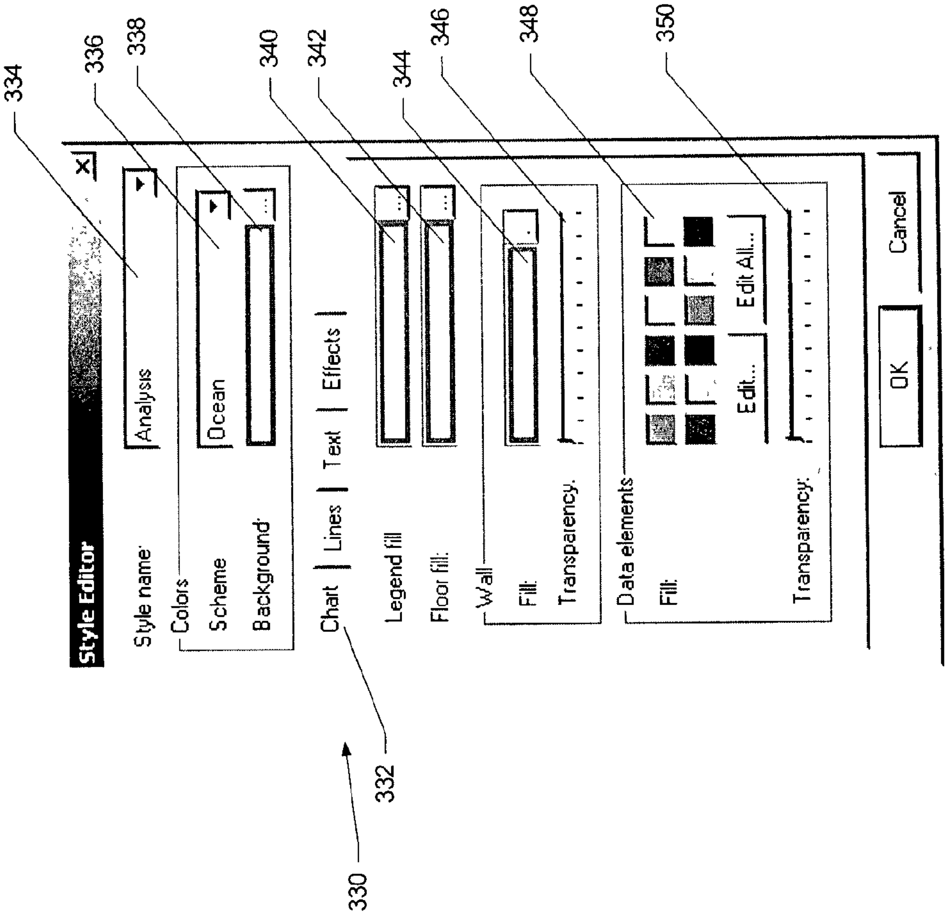
FIGS. 9–13 depict graphical user interfaces for defining or modifying styles associated with a graphs styles data structure.

FIGS. 9–13 show an example of a style editor 326 that may be used to modify style attributes of a graphical output. With reference to FIG. 9, the style editor 326 may contain tabs 330 to modify different style attributes contained within the graph styles data structure. FIG. 9 shows the chart tab 332 as activated. The user selects at 334 a style so that the user may view and possibly modify the style's attributes/display characteristics. The following chart attributes may be viewed and modified for a selected style when the chart tab 332 is activated: chart color scheme 336; chart color background 338; chart legend file 340; chart floor fill 342; chart wall fill 344; chart wall transparency level 346; chart data elements fill 348; and chart data elements transparency level 350.

Figure 10:
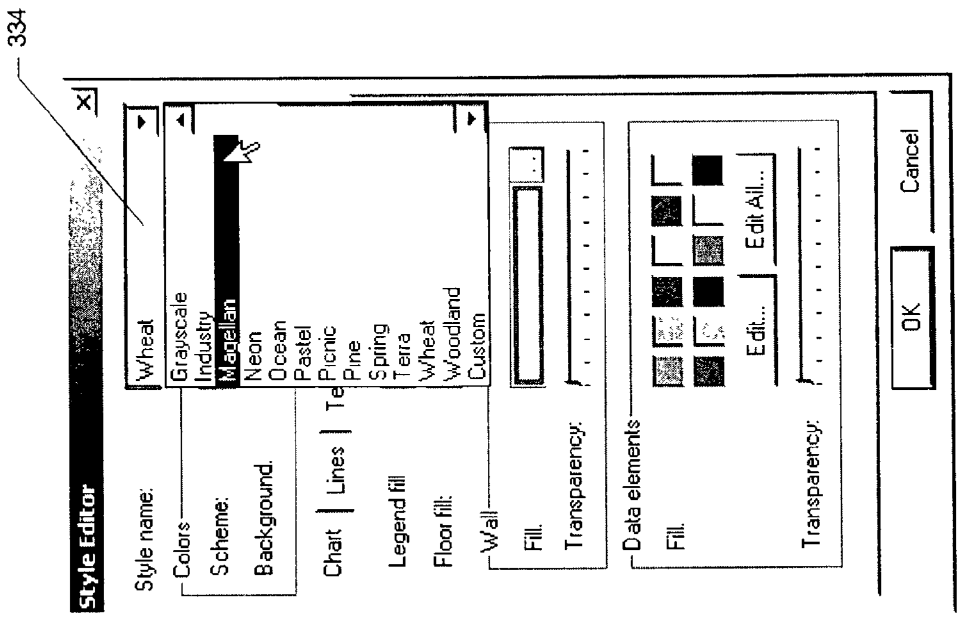

FIG. 10 shows an exemplary modification being performed by the user. The user is modifying the style from Analysis to Magellan. By selecting a different style, the user can view the current attribute values for the selected style, and modify any style attributes to suit the user's particular needs.

Figure 11:
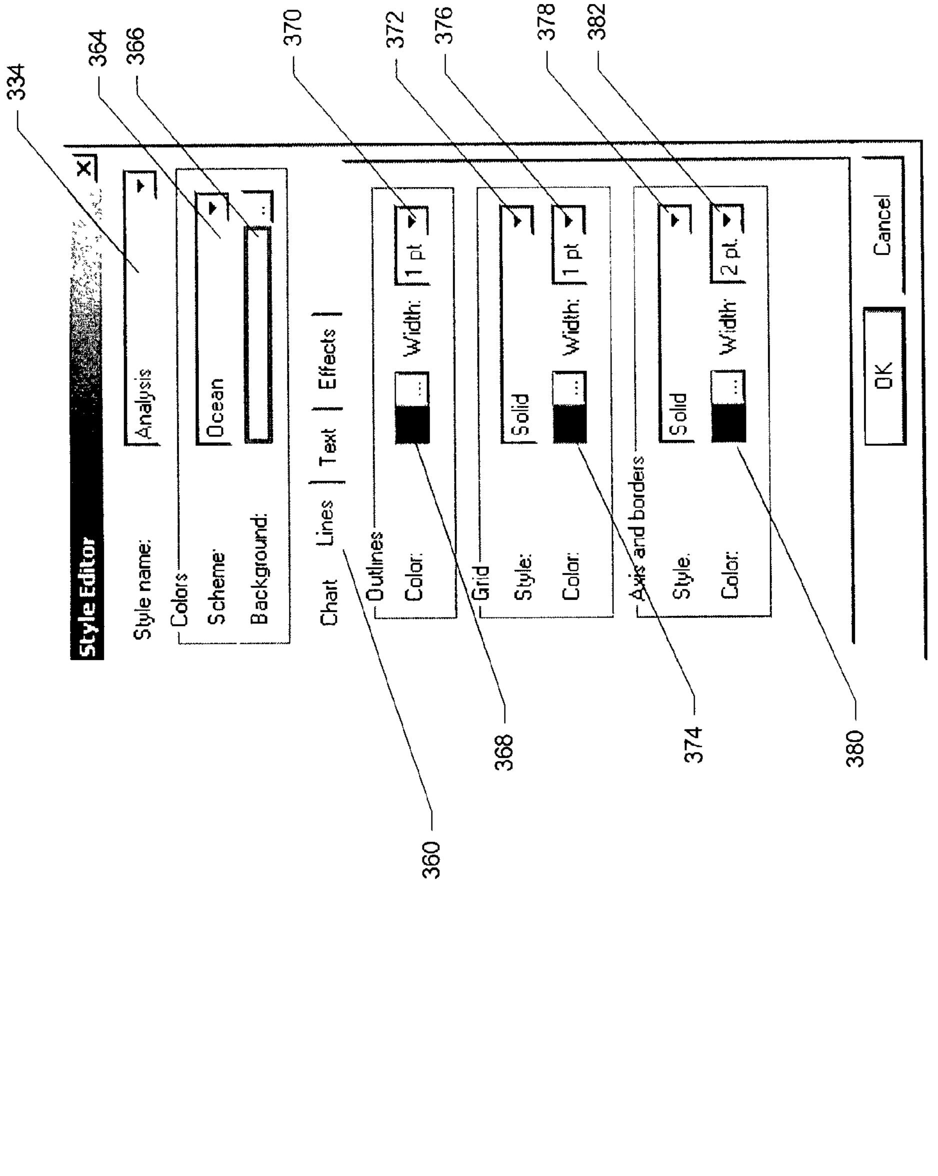

FIG. 11 shows the lines tab 360 as activated. The user selects for which style the line attributes are to be viewed and possibly altered. For a selected style, the following line attributes may be viewed and modified: lines color scheme 364; lines color background 366; lines color outline 368 and width 370; grid style 372; grid color 374; grid width 376; axis and borders style 378, color 380 and width 382.

Figure 12:
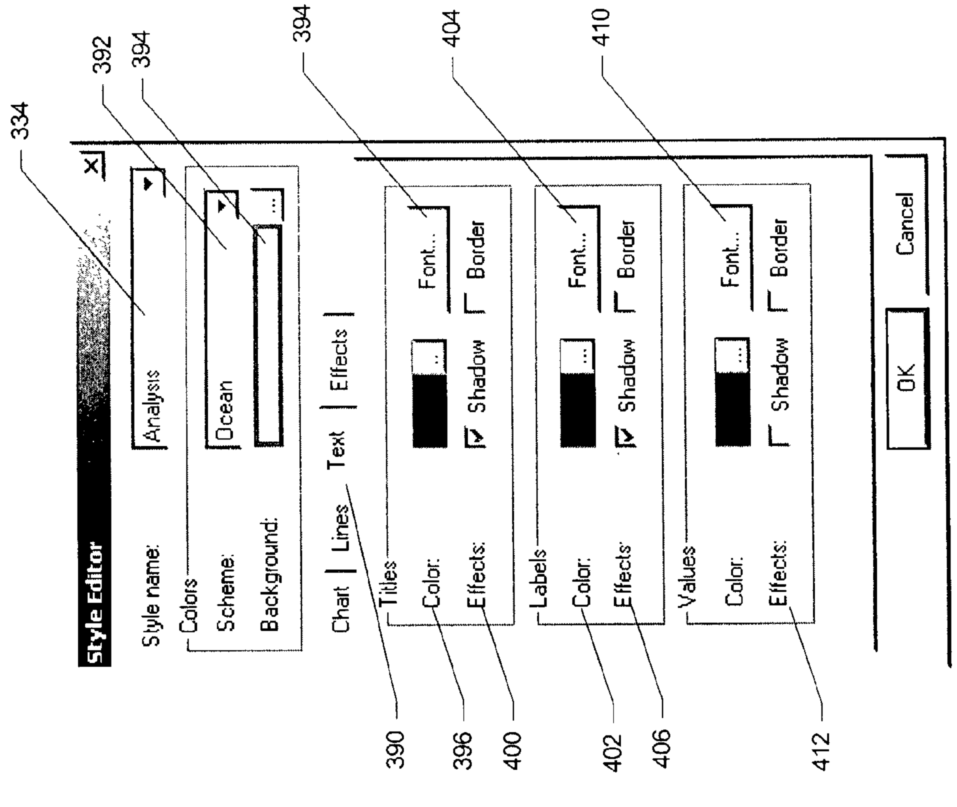

FIG. 12 shows the text tab 390 as activated. The user selects for which style the text attributes are to be viewed and possibly altered. For a selected style 334, the following text attributes may be viewed and modified: text color scheme 392; text color background 394; text title color 396 and font 398; title effects 400; label color 402 and font 404; label effects 406; values color 408 and font 410; and value effects 412.

Figure 13:
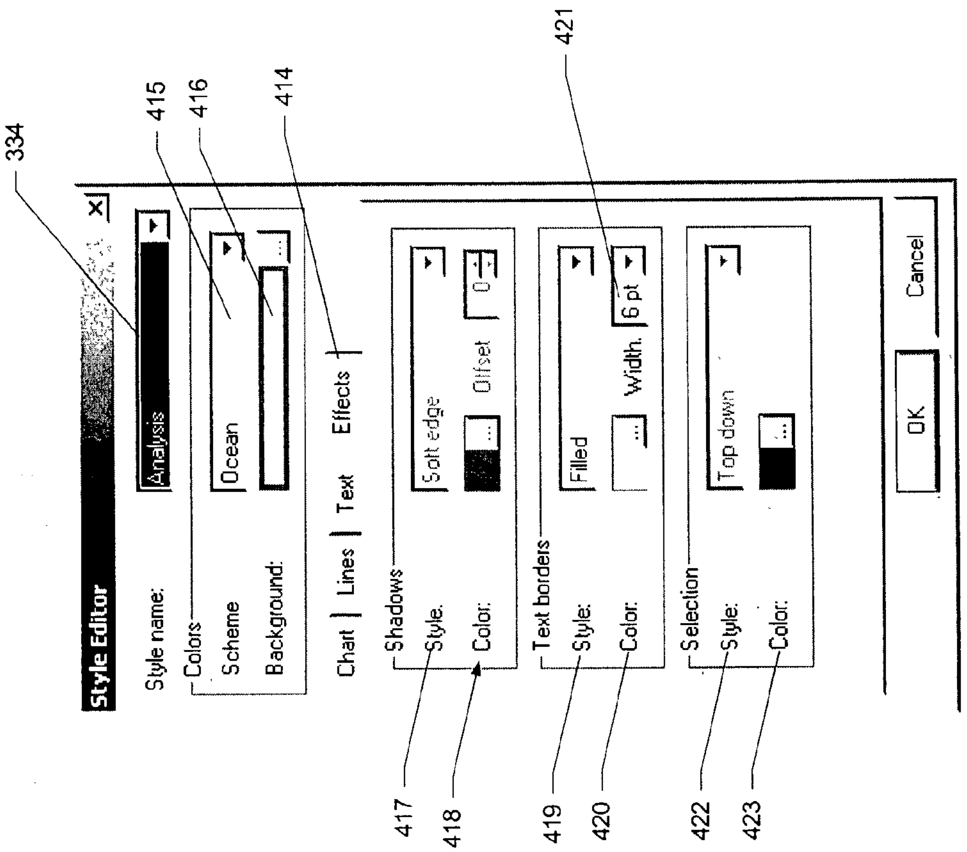

FIG. 13 shows the effects tab 414 as activated. The user selects for which style the effects attributes are to be viewed and possibly altered. For a selected style, the following effects attributes may be viewed and modified: effects color scheme 415; effects color background 416; shadow style 417; color and offset 418 (if available); text borders style 419, color 420, and width 421; selection style 422 and color 423 (if available). It should be noted that modifications via the style editor changes the graph styles data.

Figure 14:
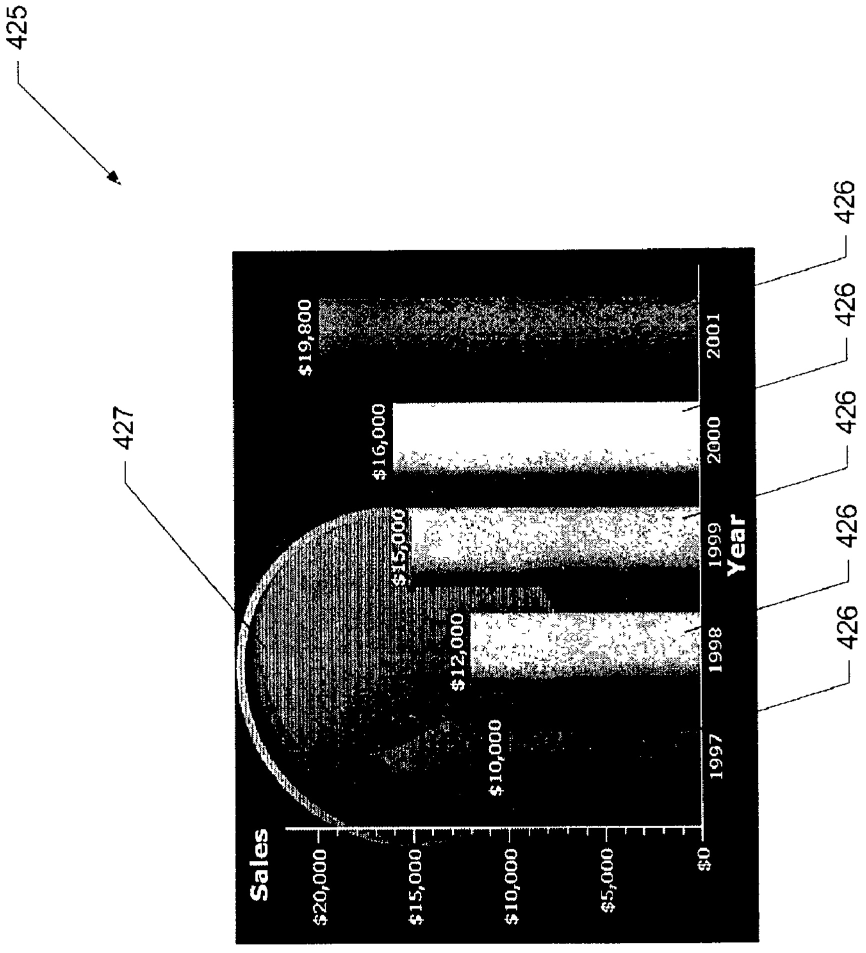
FIG. 14 is a graphical output example generated using a graph styles data structure.

FIG. 14 shows the results of a style editor modifying the graphical display format of a bar chart 425. FIG. 14 depicts at 425 a modified bar chart of FIG. 5. The style editor modified the outer contour 426 of each bar to appear as cylindrical as well as each bar's interior to be transparent. The style editor performed these modifications by adding a cylindrical contour attribute and transparency attribute to each GraphDataStyle contained within the tags 132. The wall fill 427 has also been modified to show a magnifying glass in the background. It should be understood that any attribute of the graphical output may be modified through the style editor or by another mechanism that can effect changes to the graphic styles data.

Figure 15:
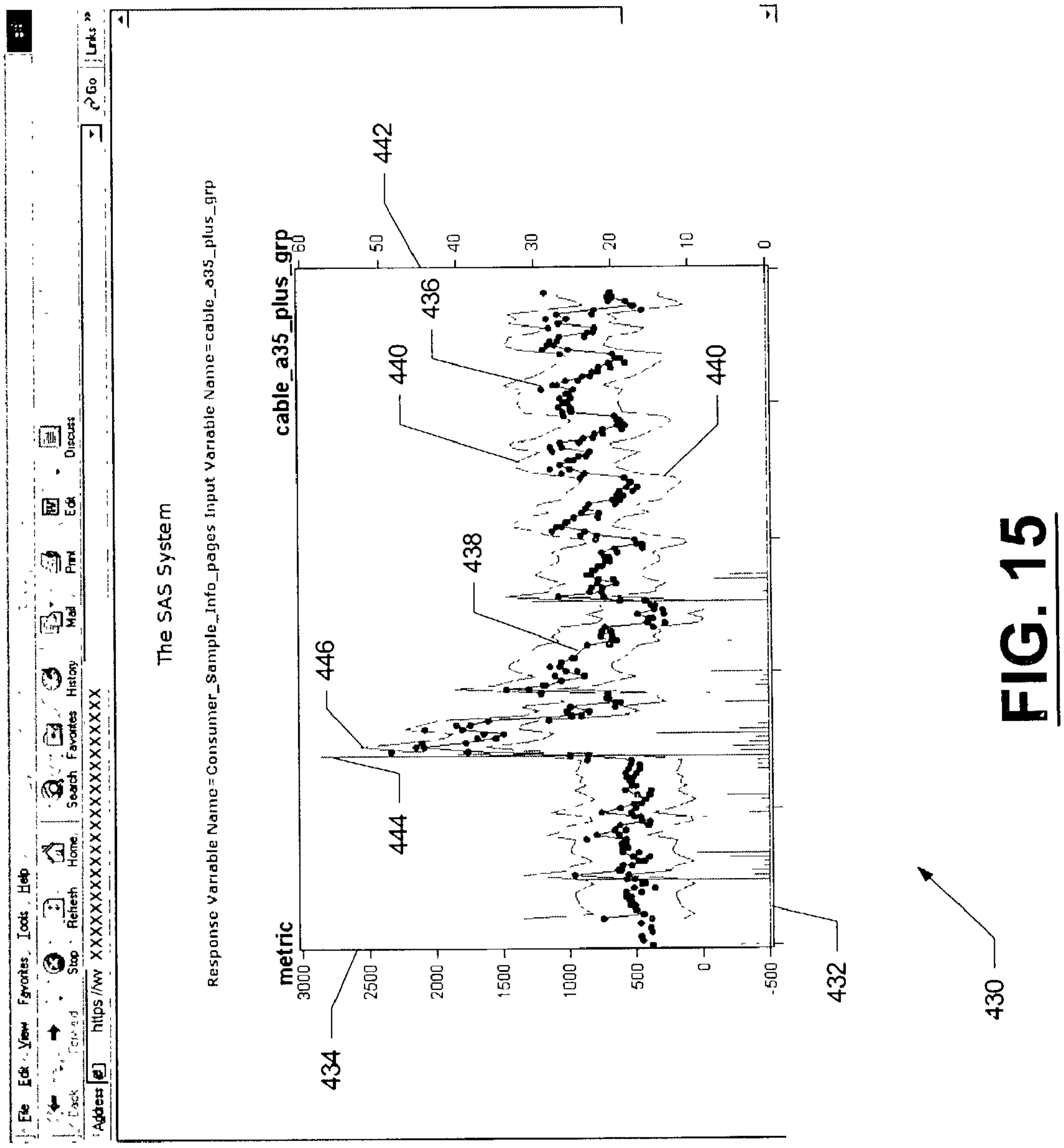
FIG. 15 is an example of graphical output that depicts statistical analysis of different response variables.

Many different graphical outputs can be created via the graphical styles data. FIG. 15 shows a statistical graphical output 430 whose format has been dictated by the graphical styles data. The statistical graphical output 430 shows a response variable analysis graph that contains two response profiles (438 and 444). The first response profile 438 predicts the number of people who have visited a particular company's Internet web site. The second response profile 444 depicts the advertisement exposure amount for a particular age group of people. The combined response profiles 438 and 444 assist the user in determining the effect of advertising exposure upon a company's Internet web site.

Time is the dimension for the abscissa axis 432 and may be in units of days. The business metric variable "consumer_sample_info_pages" comprises the dimension for the first ordinate axis 434 and represents the number of viewings of the company's web site product information pages. The actual daily number of viewings of the company's web site product information pages is shown by data points 436. The predicted daily number of viewings of the company's web site product information pages is shown by the points on curve 438. Upper and lower confidence bands 440 bound the curve at a 95% confidence level.

On the graph 430, the input variable cable_a35_plus_grp comprises the dimension for the second ordinate axis 442 and represents (in units of 100,000) people 35 years or older that watched an advertisement on cable. Vertical line responses (e.g., response 444) show the advertisement exposure amount for this group of people. The gap between a peak in the cable_a35_plus_grp dimension (as shown for example by vertical line response 444) and a peak in the consumer_sample_info_pages target variable (as shown for example by peak 446) represents the time delay of the effect that showing an advertisement has in drawing its viewers to the company's web site.

The graph styles data may be used to format different aspects of the graphical output. The confidence bands 440 may be shown in a different color and with a different line thickness than the response curve 438. Any actual points 436 that reside outside the confidence bands 440 may have a different style than actual points 436 within the confidence bands 440. The graph styles metadata may indicate that a certain set of points or set of curves has as its role to be the confidence bands within a graph. The graph styles metadata may also designate the role of any other data to have a statistical meaning. For example, the graph styles metadata may designate that a line is to act as the mean for the graph.

The graphical output 430 assists a user in determining time delays between an advertisement showing and its effect upon viewing the company's web pages. In this example, it is determined that there is about a one day delay between an advertisement showing and its effect upon viewing the company's web pages. The graph styles data structure may include information to highlight the delay aspects, such as providing arrows pointing to peaks in the first and second response curves (438 and 444) to illustrate the delays. It should be understood that any aspect of the graphical output 430 may have its format defined through the graph styles data structure, such as modifying the graphical appearance of points or curves on a graph based upon a the points or curves satisfying preselected conditions. For example, points that are further away from a preselected statistic (such as the mean) may have their styles modified to better distinguish them from those points closer to the statistic.

Figure 16:
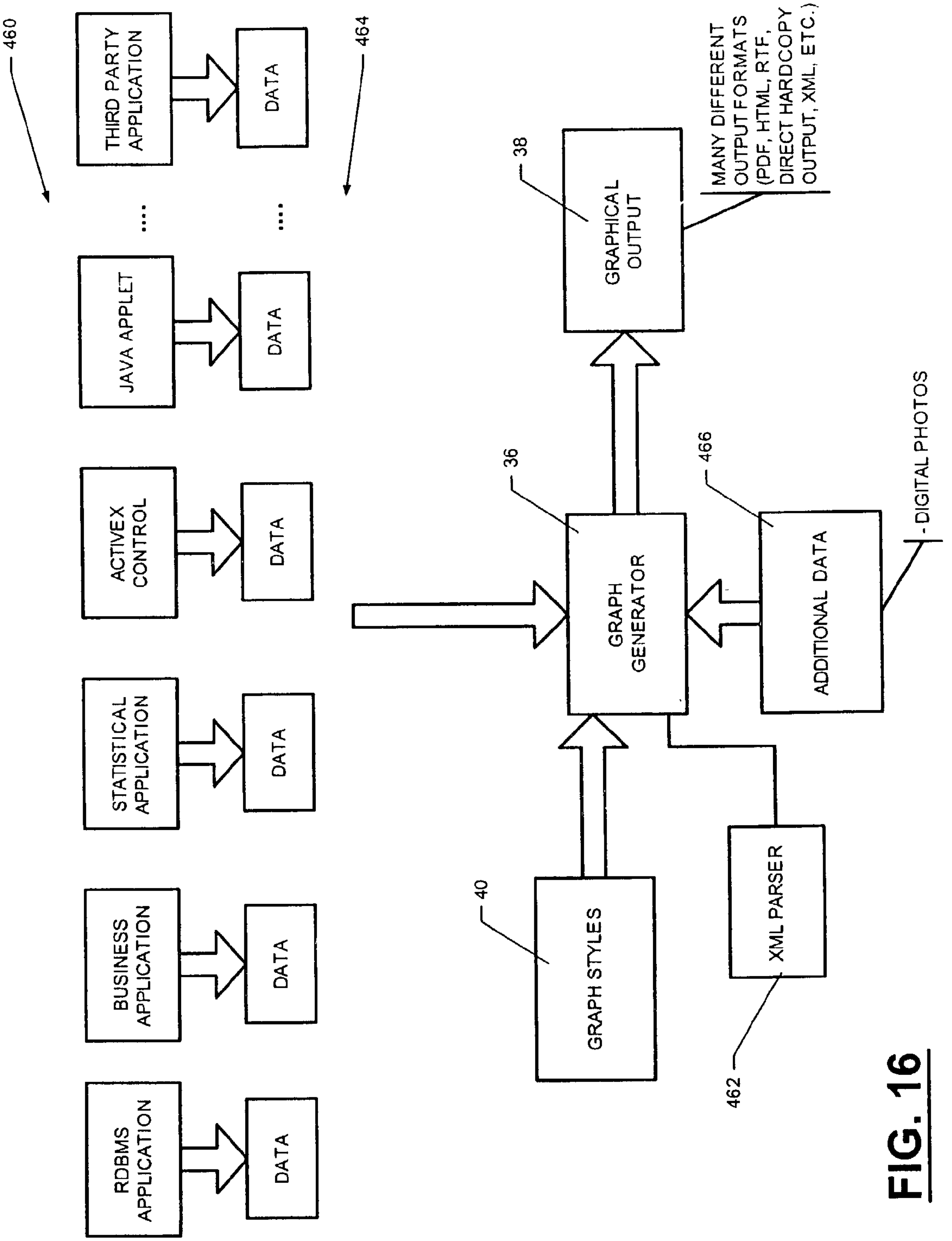
FIGS. 16 and 17 are block diagrams depicting exemplary environments that may utilize graphical outputs.

While examples have been used to disclose the invention, including the best mode, and also to enable any person skilled in the art to make and use the invention, the patentable scope of the invention is defined by the claims, and may include other examples that occur to those skilled in the art. For example, FIG. 16 shows that graph styles data 40 may describe data generated from many different sources 460, such as a relational database management system (RDBMS) application, business application, statistical application, ActiveX control, Java applet, third party application, etc. In this example, the graph styles data 40 are expressed in an XML format. The graph generator software program 36 may use an XML parser 462 to parse the graph styles XML data for determining the styles information to be associated with the incoming data 464.

The graph styles data 40 may reference additional data 466 to be incorporated in the graphical output 38, such as digital photographs or bitmap files. A company can customize its graphical output 38 by including a digital photograph of its corporate headquarters or a bitmap file containing its logo.

The graphical output 38 may assume many different output formats, such as PDF, HTML, XML, RTF, a direct output to a printer, etc. The output format may be based upon the entity that is to receive the graphical output. For example if the business application is being operated through a web browser, then the graph styles data can indicate that certain styles are to be used when rendering graphics for a web browser as well as indicate that the output should be in an HTML format.

Figure 17:
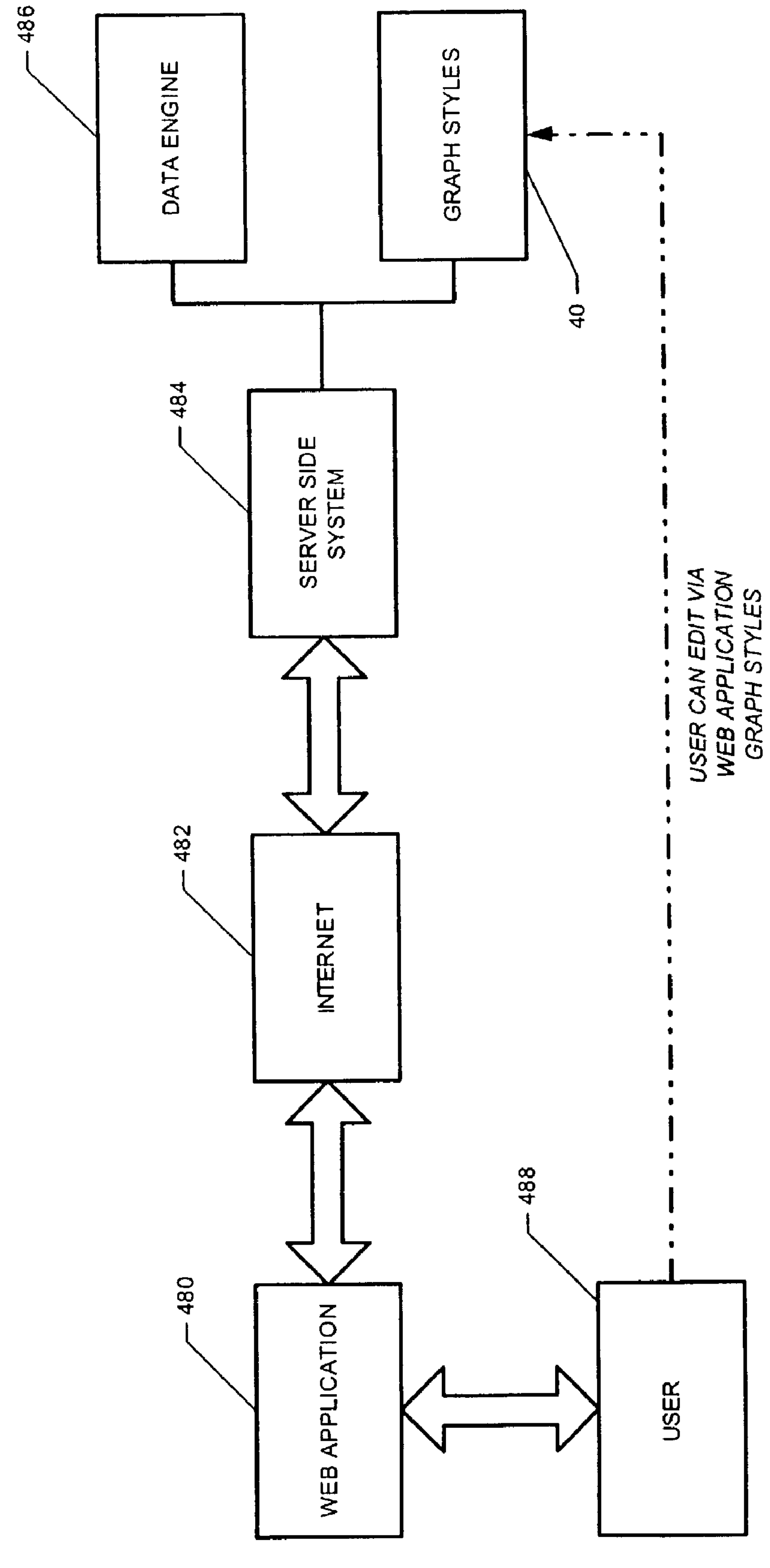

As another example of the wide scope of the graph styles system, FIG. 17 shows an exemplary web application 480 utilizing the graph styles data 40 through the Internet 482. The web application 480 requests that certain operations be performed by a server side computer system 484. A data engine 486 residing on the server side computer system 484 performs the requested operations. The server side computer system 484 may format its response for the web application 480 in accordance with the graph styles data 40. A user 488 may use the web application 480 to modify the graph styles data 40, such as through a web-enabled style editor. It should be noted that in this example, the graph styles data 40 and the software 486 generating the data may exist in two different locations (such as two different files). This provides for less coupling between the two and increases the portability of the graph styles so that it is application independent.

Figure 18:
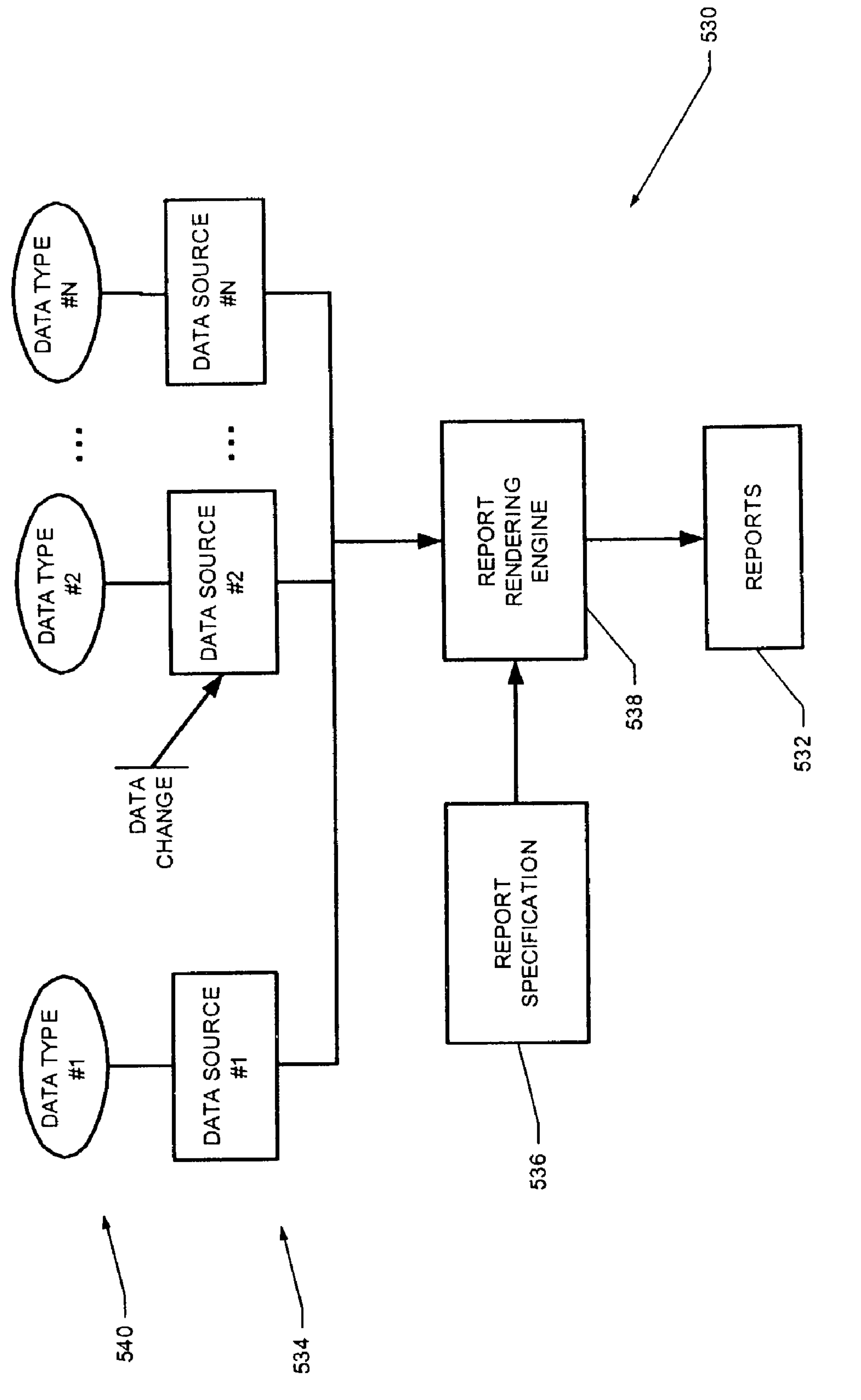
FIGS. 18 and 19 are block diagrams depicting software and computer components utilized in rendering reports.

As yet another example of the wide scope of the graph styles system, the graph styles system may be used in coordination with other report specification systems, such as the report specification system described in U.S. provisional application Ser. No. 60/368,896 entitled "COMPUTER-IMPLEMENTED SYSTEM AND METHOD FOR REPORT GENERATION" filed Mar. 29, 2002 (with Express Mail Number EL647389580US, and inventors Shaughnessy et al.). That application's full disclosure is incorporated herein and used in reference to FIGS. 18 and 19. FIG. 18 depicts a computer-implemented system 530 that renders reports 532 based upon data from different data sources 534. A report specification 536 defines a template, or description, of how the data should look based on the state of the data when a report 532 is rendered. The rendered instances 532 change as their underlying data 534 changes. Thus a rendered report 532 may be created one time and will not have to be recreated every time the data 534 changes.

Based upon the report specification 536, a report rendering engine 538 integrates different types 540 of data from different sources 534. The report specification 536 may define how the different types of data should be represented visually in a report 532 regardless of whether the data source 534 is a Microsoft Access or Oracle database, or an OLAP system or a 4GL (generation language) statistical analysis language (such as 4GL SAS language from the SAS Institute Inc.), a spreadsheet program, or a word processing program (and regardless of whether the data is in a Microsoft Word or Excel or relational format or OLAP format or other type of format).

Figure 19:
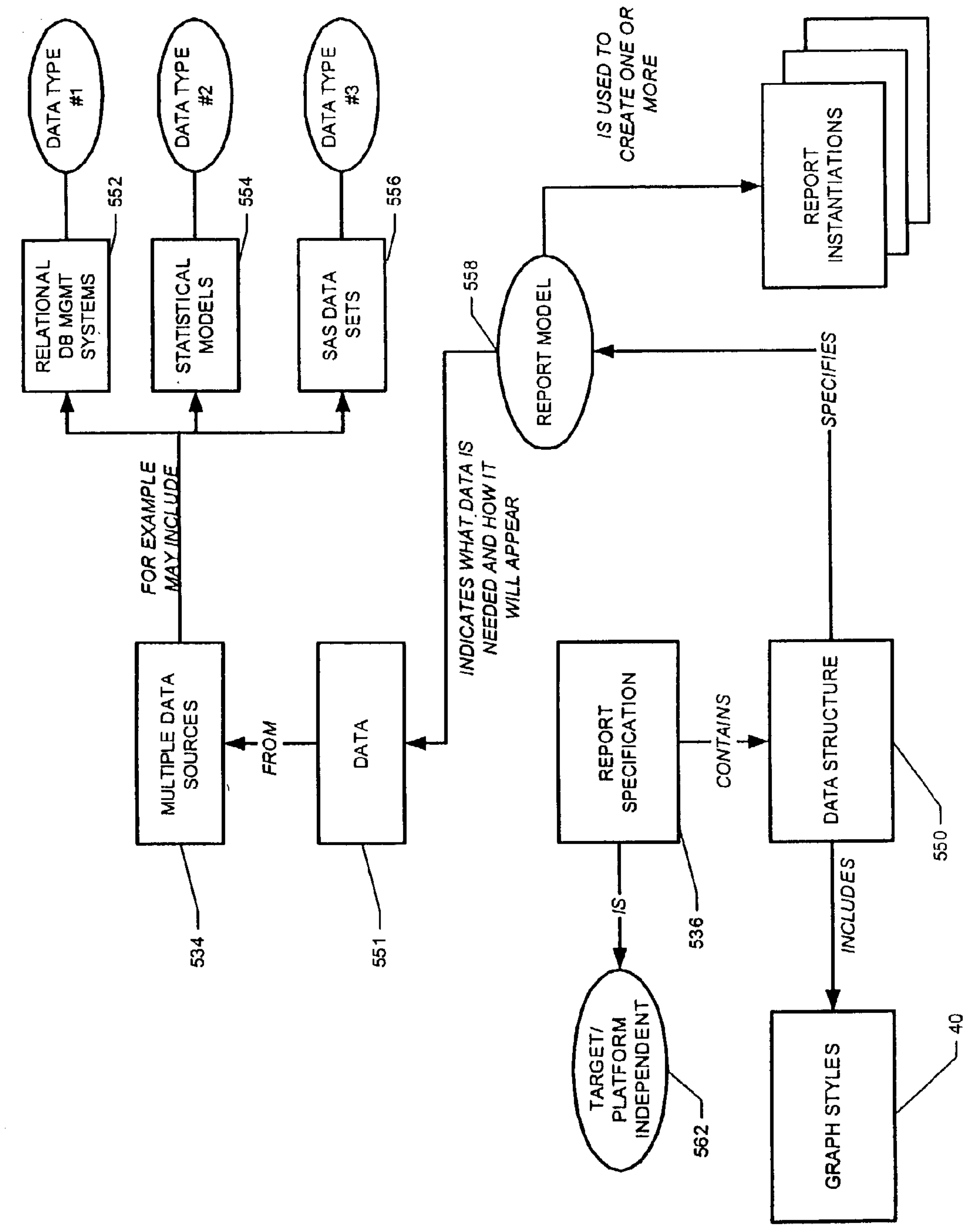

FIG. 19 depicts a report specification 536 to render reports. The report specification 536 contains a data structure 550 to dictate what data sources 534 are involved in creating a report 532 and how the data 551 should appear in the report 532. For example, the data structure 550 may specify that data 551 is to be collected from a relational database management system 552, statistical data models 554, and data sets 556 (such as those used within a statistical package, as in the package available from SAS Institute Inc. located in North Carolina).

The data structure 550 operates as a report model 558 from which one or more report instantiations 560 may be generated. If data 551 in one of the data sources (552, 554, 556) should change, the data model 558 automatically specifies where in a report instantiation 560 updates are needed. The data structure 550 may be a target and platform independent specification 562 while also allowing the report instantiations 560 to be rendered in many different formats. Thus, a report instantiation 560 may be generated in HTML, PDF, XML, RTF, WAP, and other formats. The data structure 550 may use graph styles data 40 to define the display characteristics of the graphical output in accordance with the description provided above for the graph styles data 40. The graph styles data 40 may also coordinate the appearance of graphical data with the other data contained within the data structure 550. For example, the color of the graphical data may be coordinated with the color scheme of the tabular data. Additional details of the data structure 550 and its uses are described in the aforementioned application entitled "COMPUTER-IMPLEMENTED SYSTEM AND METHOD FOR REPORT GENERATION".

It is claimed:

1. A computer-implemented method for generating data graphical displays, comprising the steps of:

receiving data to be displayed in a non-textual format, said received data being indicative of a plurality of variables;

retrieving graph style data items from a data file, said graph style data items containing display characteristics to be used in displaying the data in a non-textual format; and accessing of the graph style data items in order to display non-textual formatted output based upon the graph style data items;

said graph style data items containing graph style metadata that have descriptors specifying what statistical roles different data variables have within the data;

wherein the specified statistical roles are used to define display characteristics for the data;

wherein the data is displayed in a non-textual format in accordance with the graph style data items and the graph style metadata.

2. The method of claim 1 wherein the non-textual format includes a graphic format.

3. The method of claim 2 wherein the graphic format includes formats selected from the group consisting of pie charts, bar charts, maps, and x-y graphs.

4. The method of claim 1 wherein the display characteristics include characteristics selected from the group consisting of font characteristics, color characteristics, border characteristics, and combinations thereof.

5. The method of claim 1 wherein the graph style data items include a first association between the data and the variables;

wherein the graph style data items include a second association between the statistical roles and the different variables;

wherein the first association and the second association are used in displaying the data in the non-textual format.

6. The method of claim 5 wherein the graph style metadata identifies a data variable as having a category role and identifies another data variable as having a response role, said category role and said response role being statistical roles and used to generate different output non-textual formats.

7. The method of claim 6 wherein the different output non-textual formats include formats selected from the group consisting of pie charts, bar charts, maps, and x-y graphs;

wherein the first association and the second association are used in generating a bar chart representation of the received data;

wherein the first association and the second association are used in generating a pie chart representation of the received data.

8. The method of claim 7 wherein the category role identifies the data variable to be associated with an axis for the non-textual format.

9. The method of claim 8 wherein the response role identifies the data variable to be associated with an axis for the non-textual format.

10. The method of claim 9 wherein the category role identifies the data variable to be used to determine the number of slices in a pie chart.

11. The method of claim 10 wherein the response role identifies the data variable to be used to determine the sizes of the pie chart slices.

12. The method of claim 1 wherein the graph style data items specify different output formats based upon the type of software application that is to display the non-textual formatted output.

13. The method of claim 12 wherein the output formats include formats selected from the group consisting of HTML, XML, PDF, and text.

14. The method of claim 1 wherein non-textual formatted output includes graphical display components to indicate values of the received data, said graph style data items specifying display attributes for all of the graphical display components.

15. The method of claim 1 wherein non-textual formatted output includes graphical display components to indicate values of the received data, said graph style data items specifying different display attributes for each of the graphical display components.

16. The method of claim 1 wherein non-textual formatted output includes a first and second set of graphical display components that indicate values of the received data, said graph style data items specifying first display attributes for the first set of graphical display components, said graph style data items specifying second display attributes for the second set of graphical display components.

17. The method of claim 1 wherein the graph style data items contain theme information that is to be displayed within the non-textual formatted output.

18. The method of claim 17 wherein said graph style data items contain graph style metadata that describes display characteristics for data based upon roles of the data's variables, wherein the data is displayed in accordance with the graph style data items and the graph style metadata, wherein the theme is selected based upon the roles contained within the graph style metadata.

19. The method of claim 1 wherein the graph style data is expressed in an XML format.

20. The method of claim 1 wherein a style editor is used to modify the display characteristics of the graph style data items.

21. The method of claim 1 wherein the graph style data items are used to format display of a statistical analysis graph.

22. The method of claim 21 wherein the graph style data items are used to format display a response based upon the response's departure from a preselected statistical measure.

23. The method of claim 22 wherein the response comprises a set of points.

24. The method of claim 22 wherein the response comprises a response curve.

25. The method of claim 22 wherein the statistical measure comprises confidence bands, said graph style data items being used to format display of the response that is outside the confidence bands differently than the portion of the response contained within the confidence bands.

26. The method of claim 22 wherein the statistical measure is a mean.

27. The method of claim 1 wherein the received data was generated by data source generating means.

28. The method of claim 1 wherein the graph style data items contain data to additional data means to format the non-textual formatted output.

29. The method of claim 1 wherein the graph data items are used within server side computer system means.

30. Computer software stored on a computer readable media, the computer software comprising program code for carrying out a method according to claim 1.

31. The method of claim 1 wherein the graph style data items are contained within a data structure, said data structure also containing a data source specification and a view specification, said data source specification indicating the data to be extracted from data sources so that a report may be generated based upon the extracted data, said view specification indicating how tabular data is to be visually represented within the report, said view specification utilizing the graph style data items in order to determine how to display data in a non-textual format.

32. The method of claim 1 wherein the graph style data items are contained within a data structure, said data structure also containing data source specification means and view specification means, said data structure indicating display characteristics for tabular data, wherein the display characteristics of graphical data contained within the graph style data items are coordinated with the display characteristics of the tabular data contained within the data structure.

33. The method of claim 1, wherein the accessing of the graph style metadata having descriptors that specify statistical roles is by different types of software applications in order to display through the different types of software applications non-textual formatted output based upon the graph style metadata.

34. A computer-implemented apparatus for generating data graphical displays based upon data, comprising:

a graph generator module that receives data to be displayed in a non-textual format, said received data being indicative of a plurality of variables;

graph styles data structure that defines display characteristics to be used in displaying the data in a non-textual format, said graph style data structure containing graph style metadata that defines display characteristics for data through the metadata associating at least two of the variables with statistical roles;

said graph generator module having data access to the graph style data structure, said graph generator module generating at least one graphical output based upon the received data, said graphical output being generated in accordance with the defined data characteristics of the graph styles data structure.

35. The apparatus of claim 34 wherein the graphical output includes formats selected from the group consisting of pie charts, bar charts, maps, x-y graphs, statistical analysis graphs, and combinations thereof.

36. The apparatus of claim 34 wherein the display characteristics include characteristics selected from the group consisting of font characteristics, color characteristics, border characteristics, and combinations thereof.

37. The apparatus of claim 34 wherein the graph style metadata identifies a data variable as having a category role and identifies another data variable as having a response role, said category role and said response role being used by in different output non-textual formats.

38. The apparatus of claim 37 wherein the different output non-textual formats include formats selected from the group consisting of pie charts, bar charts, maps, statistical analysis graphs, and x-y graphs.

39. The apparatus of claim 38 wherein the category role identifies the data variable to be associated with an axis for the non-textual format, wherein the response role identifies the data variable to be associated with an axis for the non-textual format.

40. The apparatus of claim 34 wherein different types of software applications access the graph style data items in order to display non-textual formatted output.

41. The apparatus of claim 34 wherein the graph style data items specify different output formats based upon the type of software application that is to display the non-textual formatted output, wherein the output formats include formats selected from the group consisting of HTML, XML, PDF, and text.

42. The apparatus of claim 34 wherein non-textual formatted output includes graphical display components to indicate values of the received data, said graph style data items specifying display attributes for all of the graphical display components.

43. The apparatus of claim 34 wherein non-textual formatted output includes graphical display components to indicate values of the received data, said graph style data items specifying different display attributes for each of the graphical display components.

44. The apparatus of claim 34 wherein non-textual formatted output includes a first and second set of graphical display components that indicate values of the received data, said graph style data items specifying first display attributes for the first set of graphical display components, said graph style data items specifying second display attributes for the second set of graphical display components.

45. The apparatus of claim 34 wherein the graph style data items contain theme information that is to be displayed within the non-textual formatted output.

46. The apparatus of claim 45 wherein the theme is selected based upon the roles contained within the graph style metadata.

47. The apparatus of claim 34 wherein the graph styles data structure is expressed in an XML format.

48. The apparatus of claim 34 wherein a style editor is used to modify the display characteristics of the graph style data items.

49. The apparatus of claim 34 wherein the received data was generated by data source generating means.

50. The apparatus of claim 34 wherein the graph style data items contain data to additional data means to format the non-textual formatted output.

51. The apparatus of claim 34 further comprising:

a server-side computer system that contains the graph styles data structure, said server-side computer system generating graphic outputs based upon requests received through an internet network from a client web application, said generated graphic outputs having display characteristics that are based upon the graph styles data structure.

52. The apparatus of claim 34 wherein the graph styles data structure is located in a first computer-based storage medium location, and the graph generator module is located in a second computer-based storage medium location.

53. The apparatus of claim 52 wherein the data is received by the graph generator module from a third computer-based storage medium location.

54. The apparatus of claim 34 wherein the graph style data structure is contained within a report model data structure, said report model data structure also containing a data source specification and a view specification, said data source specification indicating the data to be extracted from data sources so that a report may be generated based upon the extracted data, said view specification indicating how tabular data is to be visually represented within the report, said view specification utilizing the graph style data items in order to determine how to display data in a non-textual format.

55. The apparatus of claim 34 wherein the graph style data structure is contained within a report model data structure, said report model data structure also containing data source specification means and a view specification means.

56. The apparatus of claim 34 wherein the graph style data structure contains graph style data items for formatting display of a statistical analysis graph.

57. A computer-implemented apparatus for generating data graphical displays, comprising:

means for receiving data to be displayed in a non-textual format, said received data being indicative of a plurality of variables;

means for retrieving graph style data items from a data file, said graph style data items containing display characteristics to be used in displaying the data in a non-textual format; and said graph style data items containing graph style metadata that specify statistical roles that different data variables have within the data;

means for accessing of the graph style data items by different types of software applications in order to display through the different types of software applications non-textual formatted output based upon the graph style metadata.

58. A computer-implemented apparatus for generating data graphical displays based upon data, comprising:

a graph generator module that receives data to be displayed in a non-textual format, said received data being indicative of a plurality of variables;

graph styles data structure that defines display characteristics to be used in displaying the data in a non-textual format, said graph style data structure containing graph style metadata that define display characteristics for data through the metadata associating at least two of the variables with statistical roles;

said graph generator module having data access to the graph style data structure, said graph generator module generating at least one graphical output based upon the received data, said graphical output being generated in accordance with the defined data characteristics of the graph styles data structure;

a server-side computer system that contains the graph styles data structure, said server-side computer system generating graphic outputs based upon requests received through an internet network from a client web application, said generated graphic outputs having display characteristics that are based upon the graph styles data structure;

wherein graph style information contained within the graph styles data structure is accessible by different types of software applications in order to display through the different types of software applications non-textual formatted output based upon the graph style information;

wherein the different types of software applications include at least two applications selected from the group consisting of a document creation and editing application, a web browser application, and a statistical software application.

59. The apparatus of claim 58, wherein the document creation and editing application is a word processing application; wherein a business application includes the statistical software application.

* * * * *